Oct. 16, 1928.  1,687,890
A. S. RAMAGE
PRODUCTION OF HIGHER BOILING POINT HYDROCARBONS FROM LOW
BOILING HYDROCARBONS AND HYDROCARBON GASES
Filed May 13, 1925
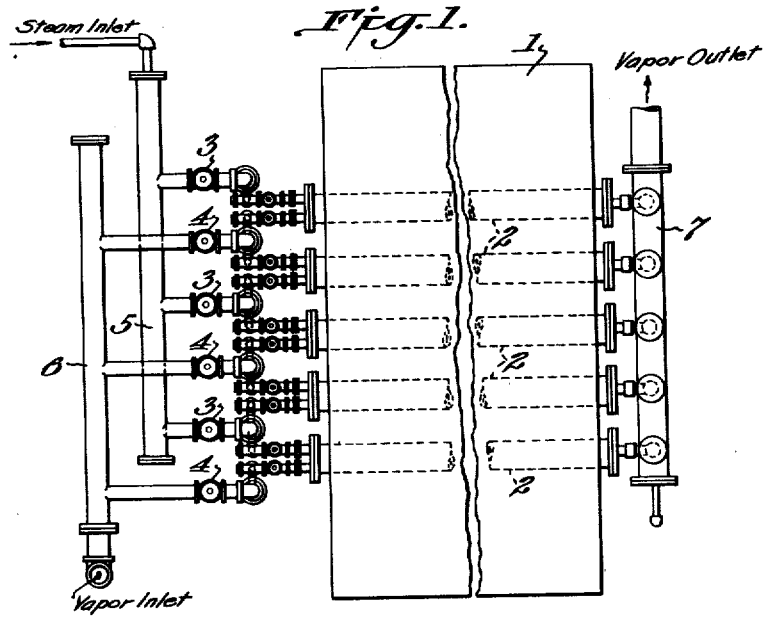
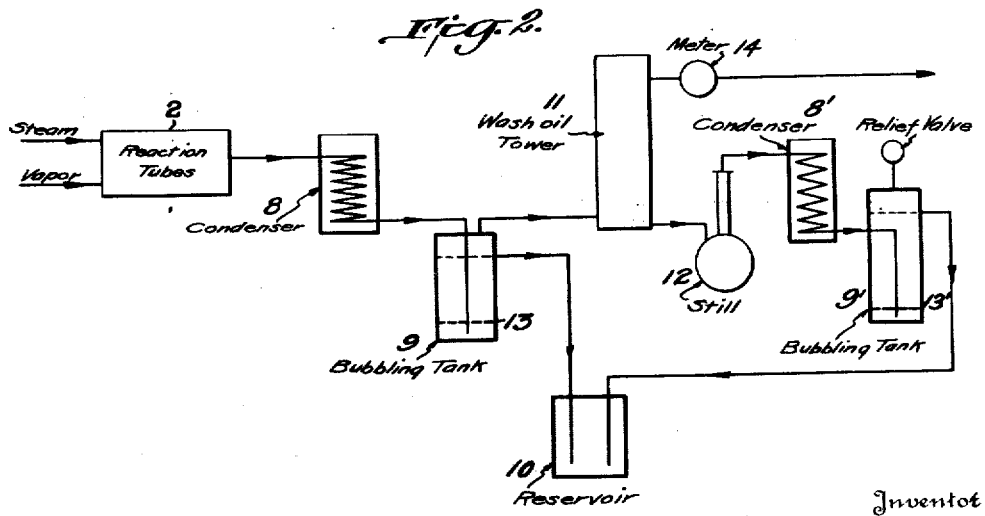

Patented Oct. 16, 1928.

1,687,890

UNITED STATES PATENT OFFICE.

ALEXANDER S. RAMAGE, OF DETROIT, MICHIGAN, ASSIGNOR, BY MESNE ASSIGNMENTS, TO GYRO PROCESS CORPORATION, A CORPORATION OF MICHIGAN.

PRODUCTION OF HIGHER-BOILING-POINT HYDROCARBONS FROM LOW-BOILING HYDROCARBONS AND HYDROCARBON GASES.

Application filed May 13, 1925. Serial No. 30,027.

The object of this invention is to form higher boiling hydrocarbons chiefly of a saturated nature suitable for use as fuel in internal combustion engines, or for the production of alcohols and other products from low boiling hydrocarbons and gases such as methane, ethane, propane, etc.

The principal reactions which may be involved to a greater or less extent in the practice of my invention may be summarized as follows:

1. Paraffin hydrocarbons on being brought into contact with ferric oxid at elevated temperatures are oxidized or dehydrogenated, forming unsaturated hydrocarbons.

2. Unsaturated hydrocarbons of low molecular weight polymerize into unsaturated hydrocarbons of higher molecular weight when subjected to elevated temperatures, the extent of polymerization depending upon the temperature and duration of treatment.

3. Ethylene and other gaseous hydrocarbons including methane, react with ferric oxid at temperatures of from 500° C. to 550° C. forming ferrous oxid, water and carbon.

4. Carbon reduces ferric oxid to ferrous oxid at temperatures of from 550° C to 600° C. with production of carbon monoxid.

5. Carbon monoxid reduces ferric oxid to ferrous oxid at temperatures of from 550° C. to 600° C. with formation of carbon dioxid.

6. Water vapor reacts with ferrous oxid at about 600° C. forming ferric oxid and highly reactive or so-called "nascent" hydrogen.

7. Unsaturated hydrocarbons are hydrogenated by nascent hydrogen.

This last reaction takes place readily, the nascent hydrogen being even more active than gaseous hydrogen in the presence of a nickel catalyzer.

My invention comprises bringing the vapors of low boiling hydrocarbon vapors or gases mixed with steam in contact with ferrous oxide at elevated temperatures, and polymerizing the product.

In the accompanying drawings, Fig. 1 is a diagrammatic view of a furnace; and

Fig. 2 is a diagrammatic view of the essential parts of a complete plant.

I so adjust the proportion between the hydrocarbon vapor and the steam as to avoid material oxidation of the ferrous oxid to ferric oxid on the one hand, or material reduction to metallic iron on the other.

In one embodiment of my invention I have employed a tube 4" in diameter and 20' long loosely packed with ferrous oxid so that gas may readily pass through the tube and come into intimate contact with the ferrous oxid. The tube is connected with a source of vapor or gases under pressure and with any suitable source of steam under pressure. The steam and the hydrocarbon vapors or gases must be supplied to the tube in accurately regulated quantities with suitable orifice valves to allow the hydrocarbon vapors and the steam to be admitted in the proportions substantially of 10 parts steam to 100 parts hydrocarbon vapors or gases, by weight.

The tube may be heated in any suitable way, for instance, by means of electrically heated resistance wire wound around the tube. The heating is preferably so regulated as to maintain a graduated temperature gradient increasing from the inlet toward the outlet end of the tube, but this is not essential to successful operation.

The temperature of the tube at the outlet end is preferably kept about 650–700° C. and at the inlet end at such a temperature that the gases upon entering will be about 600° C.

I do not claim herein any specific form of apparatus for subjecting the hydrocarbon vapors in admixture with steam to the action of ferrous oxid. A type of furnace suitable for the purpose is however illustrated diagrammatically in Fig. 1, wherein 1 indicates the furnace chamber carrying a battery of parallel horizontal reaction tubes 2—2. Each tube is provided at its inlet end with valve connections 3 and 4 for the introduction respectively of steam and hydro-carbon vapors, from the respective headers 5 and 6. 7 represents the outlet header for the reaction products, leading to an appropriate condensing and recovery system.

Referring to Fig. 2, the products leaving the outlet end of the tube 2 are passed through a condenser 8 in which the heavier products are condensed and separated and flow into bubbling tank 9 and eventually into reservoir 10. The uncondensed vapors and gas are bubbled through the condensate in bubbling tank 9 and then compressed in a compressor (not shown) and passed into wash oil in any of the known methods such as through a tower 11 through which the wash oil is trickling over grids or other filler. The unsaturated gaseous and low boiling hydrocarbons are thus polymerized into higher boiling hydrocarbons even forming hydrocarbons with a boiling point up to 200° C. To obtain the product from the wash oil, it is necessary to distill in the usual still 12 fitted with the usual condenser 8' and a bubbling tank 9' filled three quarters full with condensate which is kept cold. When the still 12 reaches a temperature of about 50° C. great quantities of gases are liberated due to the fact that the low boiling polymerized products in the wash oil revert to a gas of an average composition of $C_4H_8$ having a thermal value of about 3700 B. t. u. This rush of gas continues at such a rate as to put a pressure on the still 12 and passes through the condenser 8' unchanged with the exception of cooling, but is instantly dissolved with polymerization in the cold condensate in the bubbling tank. These bubbling tanks 9 and 9' are preferably made at least 3 feet in diameter, 7 feet deep, with an ovrflow 2 feet from the top. The cooled gases are led to the bottom and issue into the condensate through perforated plates 13 and 13'. The gases repolymerize and form liquid which excess overflows into the reservoir 10, 100 cubic feet of the gas giving an increase in the condensate of about 3 gallons. The higher boiling polymerized products distill off from the wash oil and condense in the condenser 8' in the usual way and flow to the reservoir 10 so that the total product in the reservoir 10 is a motor fuel with an inital point of about 20° C. and end point of about 210° C.

The washed gas finally passes through a meter 14 to a gasometer (not shown). When the process is carried on with the tube 2 heated to a temperature of 600° C. at the inlet end and 700° C. at the outlet end, it is necessary to employ extra good washing and usually also compression to extract the very light spirits from the gas. The use of temperatures from 500° C. at the inlet end of the tube to 620° C. at the outlet end is preferable for the production of ordinary gasoline spirits.

The proportion of steam to hydrocarbon vapors passed through the tube 2 must be carefully regulated. If too much steam is supplied the ferrous oxid will be oxidized to ferric oxid which will accumulate and the conversion of the heavier unsaturated hydrocarbons to lighter saturated hydrocarbons will soon cease. It is also essential to avoid the reduction of the ferrous oxid to metallic iron because if this occurs carbon will deposit in the tube 2 and ultimately stop the passage of gas therethrough. Under most advantageous operation conditions as described herein the contents of the tube 2 remain at all times essentially in the ferrous state, being substantially free through the normal working length of the tube from ferric oxid, metallic iron, or deposited carbon. I have found that in treating the lighter fractions of casing head gasoline or natural gas the ratio of 10 parts of steam to 100 parts of oil gives satisfactory results.

When the process is operating properly no water will be found in the gaseous products at the exit end of the tube 2 and the ferrous oxid in the tube 2 will be free from ferric oxid, metallic iron and carbon. The process when properly regulated is therefore continuous.

The composition of the product varies a little with the temperature used but it appears to be essentially composed of cyclo-paraffins, and the unsaturated compounds are believed to consist principally of cyclo-olefins and polymerized olefins.

The reactions in the tube 2 are undoubtedly very complicated, involving a combination of several instantaneous or simultaneous reactions. Among such reactions the following may perhaps occur, although no limitation of my invention is to be inferred therefrom:

The steam reacts with ferrous oxid forming ferric oxid and hydrogen, the latter in highly reactive or nascent form; the ferric oxid is at once re-reduced to ferrous oxid with coincident formation of hydrocarbons of a lower degree of saturation and probably of simpler constitution and lower boiling point. These unsaturated hydrocarbons react under the operating conditions with the hydrogen derived from the steam, the product being light hydrocarbons which are polymerized as set forth into heavier hydrocarbons. The oxygen from the steam ultimately appears largely as carbon monoxid and carbon dioxid formed by the oxidation of the carbon. The hydrogen equivalent of this deposited carbon appears largely or entirely in the exit gases.

With a maximum temperature of about 620° C. indicated by a thermocouple at the center of the 4" tube as disclosed I have found that about two-thirds of the ethylene is decomposed, the balance passing into the gaseous products. The composition of the fixed gas is about 50% to 70% of hydrogen, about 20% ethylene and about 10% carbon monoxide. The quantity and composition of the fixed gases will vary somewhat according to the temperature, the velocity of the feed, the proportion of steam used, and other conditions of the process.

Any of the standard methods of gas washing may be used and the wash oil and condensate distilled by the sensible heat of the gases issuing from the furnace.

In starting my process the reaction tube may be filled with ferric oxid and this reduced to ferrous oxid by heating and passing a reducing gas through the tube. Hydrocarbon and steam are then supplied to the tube and the process proceeds as described.

I claim:

5. Process of converting low boiling point hydrocarbons into higher boiling hydrocarbons which comprises mixing a hydrocarbon vapor similar to the lighter fractions of casing head gasoline with steam and contacting the resulting mixture with ferrous oxid at a temperature of at least 600° C.

In testimony whereof, I affix my signature.

ALEXANDER S. RAMAGE.

CERTIFICATE OF CORRECTION.

Patent No. 1,687,890.   October 16, 1928.

ALEXANDER S. RAMAGE.

It is hereby certified that the name of the assignee in the above numbered patent was erroneously described and specified as "Gyro Process Corporation" whereas said name should have been described and specified as Gyro Process Company, as shown by the records of assignments in this office; and that the said Letters Patent should be read with this correction therein that the same may conform to the record of the case in the Patent Office.

Signed and sealed this 5th day of December, A. D. 1933.

F. M. Hopkins (Seal)   Acting Commissioner of Patents.

a reducing gas through the tube. Hydrocarbon and steam are then supplied to the tube and the process proceeds as described.

I claim:

5. Process of converting low boiling point hydrocarbons into higher boiling hydrocarbons which comprises mixing a hydrocarbon vapor similar to the lighter fractions of casing head gasoline with steam and contacting the resulting mixture with ferrous oxid at a temperature of at least 600° C.

In testimony whereof, I affix my signature.

ALEXANDER S. RAMAGE.

CERTIFICATE OF CORRECTION.

Patent No. 1,687,890.　　　　　　　　　　　　　　October 16, 1928.

ALEXANDER S. RAMAGE.

It is hereby certified that the name of the assignee in the above numbered patent was erroneously described and specified as "Gyro Process Corporation" whereas said name should have been described and specified as Gyro Process Company, as shown by the records of assignments in this office; and that the said Letters Patent should be read with this correction therein that the same may conform to the record of the case in the Patent Office.

Signed and sealed this 5th day of December, A. D. 1933.

F. M. Hopkins (Seal)　　　　　　　　　　　　　　　　Acting Commissioner of Patents.